US012260873B2

(12) United States Patent
Kang

(10) Patent No.: US 12,260,873 B2
(45) Date of Patent: Mar. 25, 2025

(54) METHOD AND APPARATUS OF NOISE REDUCTION, ELECTRONIC DEVICE AND READABLE STORAGE MEDIUM

(71) Applicant: UNISOC (CHONGQING) TECHNOLOGIES CO., LTD., Chongqing (CN)

(72) Inventor: Li Kang, Chongqing (CN)

(73) Assignee: UNISOC (CHONGQING) TECHNOLOGIES CO., LTD., Chongqing (CN)

( * ) Notice: Subject to any disclaimer, the term of this patent is extended or adjusted under 35 U.S.C. 154(b) by 326 days.

(21) Appl. No.: 17/850,936

(22) Filed: Jun. 27, 2022

(65) Prior Publication Data

US 2022/0328058 A1 Oct. 13, 2022

Related U.S. Application Data

(63) Continuation of application No. PCT/CN2020/086639, filed on Apr. 24, 2020.

(30) Foreign Application Priority Data

Dec. 26, 2019 (CN) ......................... 201911368908.7

(51) Int. Cl.
*G10L 21/0232* (2013.01)
*G10L 21/0216* (2013.01)

(52) U.S. Cl.
CPC .................... *G10L 21/0232* (2013.01); *G10L 2021/02165* (2013.01); *G10L 2021/02166* (2013.01)

(58) Field of Classification Search
CPC ....... G10L 21/0232; G10L 2021/02165; G10L 2021/02166; G10L 21/0208; G10L 21/0216

(Continued)

(56) References Cited

U.S. PATENT DOCUMENTS 8,175,291 B2 * 5/2012 Chan .................. G10L 21/0208 381/94.7
2010/0246851 A1 * 9/2010 Buck .................. G10L 21/0208 381/94.1

(Continued)

FOREIGN PATENT DOCUMENTS

CN 105590630 A 5/2016
CN 106653043 A 5/2017

(Continued)

OTHER PUBLICATIONS

Cohen, Israel. "Two-Channel Signal Detection and Speech Enhancement Based on the Transient Beam-to-Reference Ratio" (Year: 2003).*

(Continued)

*Primary Examiner* — Paras D Shah
*Assistant Examiner* — Fouzia Hye Solaiman
(74) *Attorney, Agent, or Firm* — KILPATRICK TOWNSEND & STOCKTON LLP

(57) ABSTRACT

A method of noise reduction, which is applied to an electronic device. The electronic device includes a first sound collector and a second sound collector, installation positions of the first sound collector and the second sound collectors are different; the method includes: determining a desired sound signal and an interference sound signal based on a first sound signal collected by the first sound collector and a second sound signal collected by the second sound collector (S102); obtaining a third sound signal by performing coherent noise elimination processing on the desired sound signal based on the interfering sound signal (S103); and then obtaining a target sound signal by performing incoherent noise suppression processing on the third sound signal based on a probability of existence of a speech in the third sound signal (S104).

18 Claims, 5 Drawing Sheets

(58) Field of Classification Search
USPC .......................................................... 704/226
See application file for complete search history.

(56) References Cited

U.S. PATENT DOCUMENTS

| | | | | |
|---|---|---|---|---|
| 2016/0192068 A1* | 6/2016 | Ng | ......................... | H04R 1/406 381/92 |
| 2020/0336833 A1* | 10/2020 | Cho | ....................... | H04R 5/033 |

FOREIGN PATENT DOCUMENTS

| | | | | |
|---|---|---|---|---|
| CN | 107993670 A | 5/2018 | | |
| CN | 109308904 A | 2/2019 | | |
| CN | 109473118 A | 3/2019 | | |
| CN | 109994120 A | 7/2019 | | |
| WO | 2009043066 A1 | 4/2009 | | |
| WO | WO-2017002525 A1 * | 1/2017 | ......... | G10L 21/0216 |
| WO | 2017132958 A1 | 8/2017 | | |

OTHER PUBLICATIONS

Israel Cohen et al: "Two-channel signal detection and speech enhancement based on the transient beam-to-reference ratio", 2003 IEEE International CONFE, vol. 5, Apr. 6, 2003 (Apr. 6, 2003), pp. V 233-V 236.

Junfeng Li et al: "Theoretical Analysis of Microphone Arrays With Postfiltering for Coherent and Incoherent Noise Suppression in Noisy Environments", Hoboken, NJ : Wiley-Interscience, Sep. 12, 2005 (Sep. 12, 2005), pp. 85-88.

Extended European Search Report received in the corresponding European Application 20905296.8, mailed Dec. 14, 2022.

International Search Report and Written Opinion mailed in International Application PCT/CN2020/086639 on Sep. 30, 2020.

The first Office Action received in CN Application 201911368908.7 on Dec. 8, 2020.

The second Office Action received in CN Application 201911368908.7 on Jul. 5, 2021.

Robert J. Mcaulay et al., "Speech Enhancement Using a Soft-Decision Noise Suppression Filter", issued on IEEE Transactions on Acoustics, Speech, and Signal Processing, vol. ASSP-28, No. 2, Apr. 1980.

Ni Zhong, "The Research of Speech Enhancement Method Based on Microphone Array", a thesis submitted in partial satisfaction of the requirements for the degree of Master of Engineering in Electronic and Communication Engineering in the Graduate School of Hunan University.

* cited by examiner

METHOD AND APPARATUS OF NOISE REDUCTION, ELECTRONIC DEVICE AND READABLE STORAGE MEDIUM

CROSS-REFERENCE TO RELATED APPLICATIONS

This application is a continuation application of International Application NO. PCT/CN2020/086639, filed on Apr. 24, 2020, which claims priority to Chinese Application No. 2019113689087, filed on Dec. 26, 2019, both of the applications are incorporated by reference herein.

TECHNICAL FIELD

Embodiments of the present disclosure relate to the technical field of noise reduction, and in particular, to a method and apparatus of noise reduction, an electronic device, and a readable storage medium.

BACKGROUND

With the development of science and technology, people have increasingly requirements for a quality of life, and a manner of conducting speech communication and speech interaction through electronic products has become increasingly common.

SUMMARY

Embodiments of the present disclosure provide a method and apparatus of noise reduction, an electronic device, and a readable storage medium.

In a first aspect, an embodiment of the present disclosure provides a method of noise reduction, and the method can be applied to an electronic device, where the electronic device includes a first sound collector and a second sound collector, and installation positions of the first sound collector and the second sound collector are different; the method includes:

- acquiring a first sound signal collected by the first sound collector and a second sound signal collected by the second sound collector;
- determining a desired sound signal and an interference sound signal based on the first sound signal and the second sound signal;
- obtain a third sound signal by performing coherent noise elimination processing on the desired sound signal based on the interference sound signal; and
- obtain a target sound signal by performing incoherent noise suppression processing on the third sound signal based on a probability of existence of a speech in the third sound signal.

In a second aspect, an embodiment of the present disclosure provides a noise reducing apparatus, the apparatus is applied to an electronic device, and the electronic device includes a first sound collector and a second sound collector, installation positions of the first sound collector and the first sound collector are different; the apparatus includes:

- at least one processor; and
- a memory communicatively connected with the at least one processor;
- the at least one processor executes computer-executable instructions stored in the memory to cause the at least one processor to:
- acquire a first sound signal collected by the first sound collector and a second sound signal collected by the second sound determine a desired sound signal and an interference sound signal based on the first sound signal and the second sound signal;
- obtain a third sound signal by performing coherent noise elimination processing on the desired sound signal based on the interfering sound signal; and
- obtain a target sound signal by performing incoherent noise suppression processing on the third sound signal based on a probability of existence of a speech in the third sound signal.

In a third aspect, an embodiment of the present disclosure provides a computer-readable storage medium, where computer-executable instructions are stored in the computer-readable storage medium, and when a processor executes the computer-executable instruction, the processor is enabled to:

- acquire a first sound signal collected by the first sound collector and a second sound signal collected by the second sound collector;
- determine a desired sound signal and an interference sound signal based on the first sound signal and the second sound signal;
- obtain a third sound signal by performing coherent noise elimination processing on the desired sound signal based on the interference sound signal; and
- obtain a target sound signal by performing incoherent noise suppression processing on the third sound signal based on a probability of existence of a speech in the third sound signal.

In the method and apparatus of noise reduction, electronic device, and readable storage medium provided by the embodiments of the present disclosure, adopt a first sound collector and a second sound collector to determine a desired sound signal and an interference sound signal, and obtain a third sound signal by performing coherent noise elimination processing on the desired sound signal based on the interference sound, and then obtain a target sound signal by performing incoherent noise suppression processing on the third sound signal based on a probability of existence of a speech in the third sound signal.

BRIEF DESCRIPTION OF DRAWINGS

In order to more clearly illustrate embodiments of the present disclosure or technical solutions in the related art, in the following, accompanying drawings used in a description of the embodiments or the related art will be briefly introduced. Obviously, the accompanying drawings in the following are some embodiments of the present disclosure. For those of ordinary skill in the art, other accompanying drawings can also be obtained based on these accompanying drawings without paying any creative effort.

Figure 5:
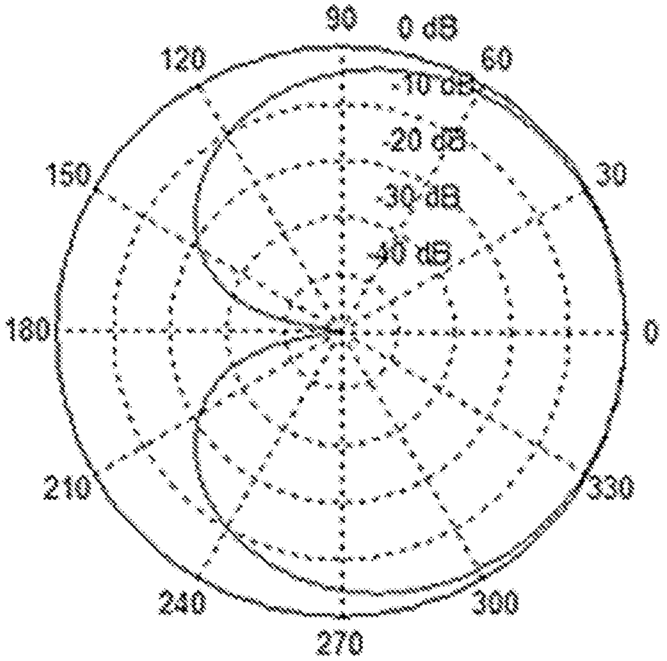
Figure 6:
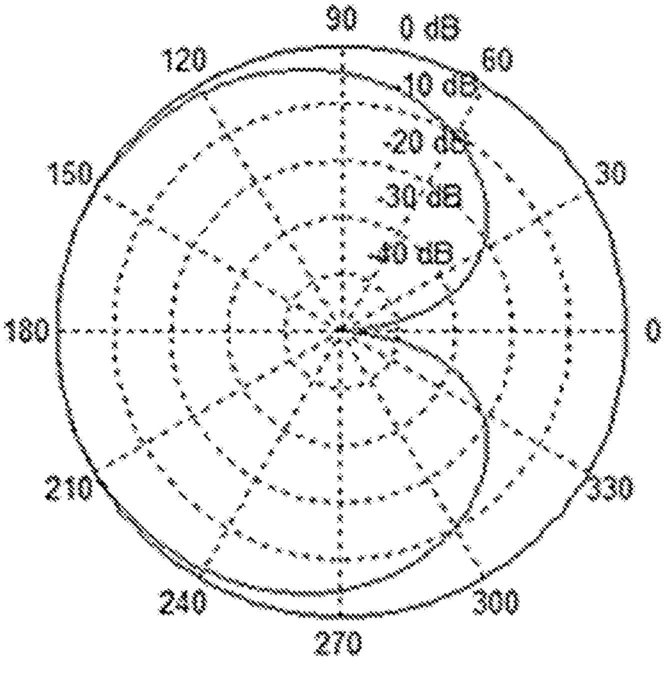
Figure 7:
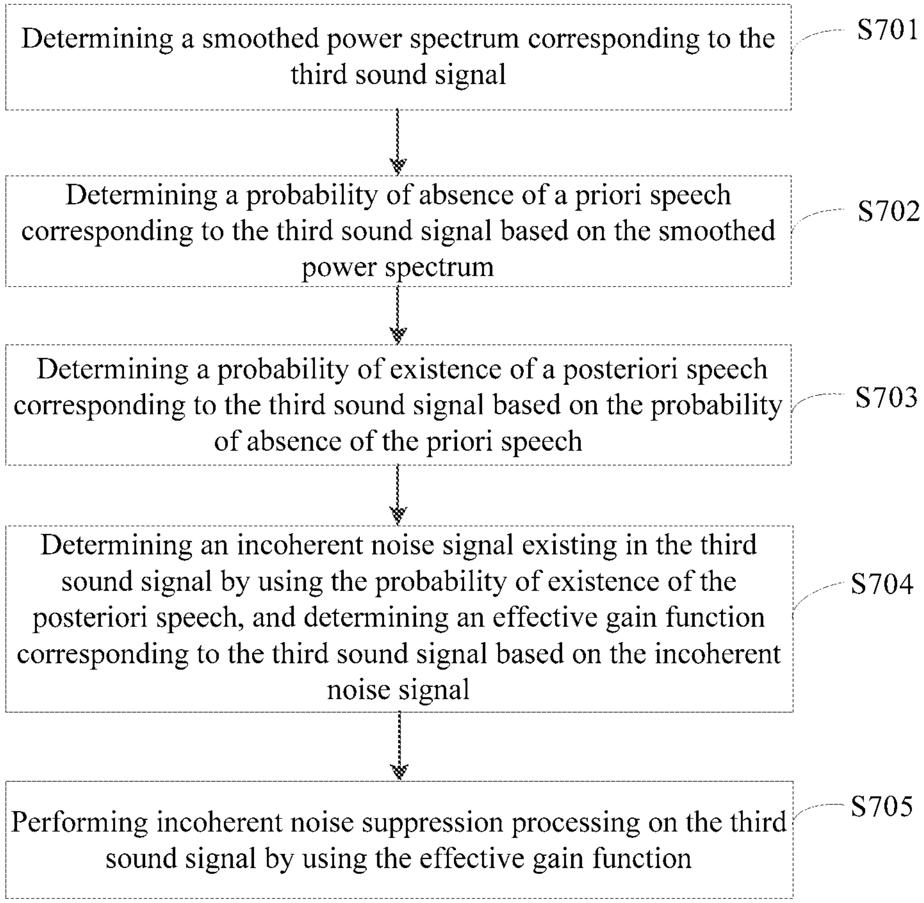
Figure 8:
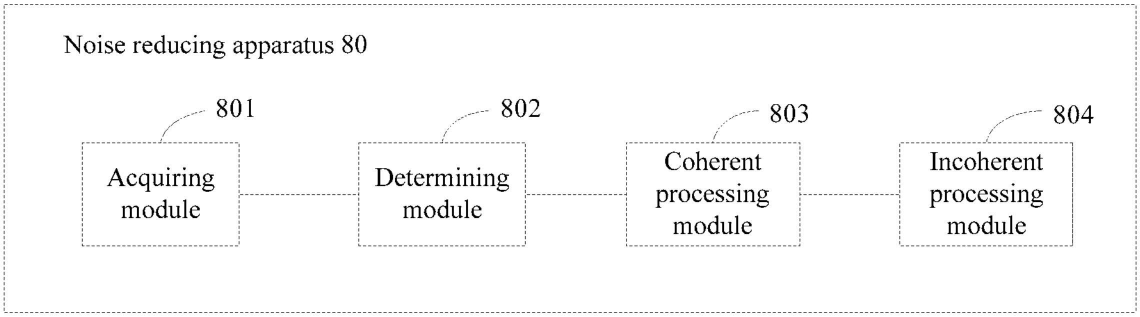
Figure 9:
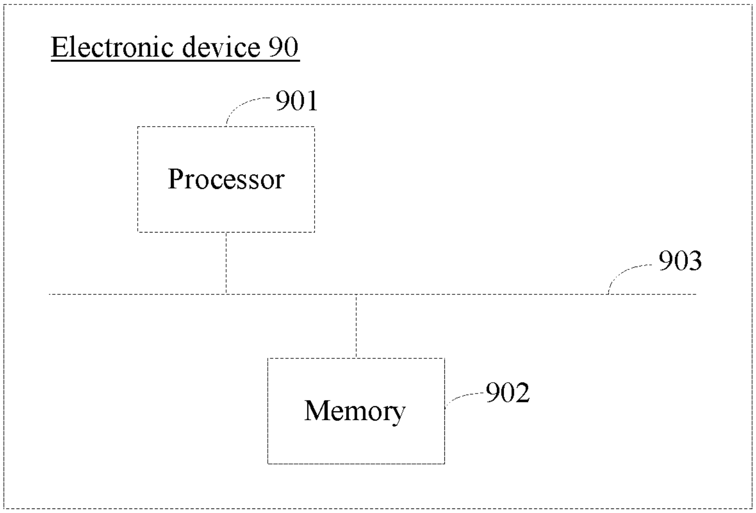

FIG. **4*a*** is a schematic diagram I of spatial filtering in a method of noise reduction according to an embodiment of the present disclosure;

FIG. **4*b*** is a schematic diagram II of spatial filtering in a method of noise reduction according to an embodiment of the present disclosure;

FIG. 5 is a beam schematic diagram of a desired sound signal according to an embodiment of the present disclosure;

FIG. 6 is a beam schematic diagram of an interfering sound signal according to an embodiment of the present disclosure;

FIG. 7 is a schematic flowchart II of a method of noise reduction provided by an embodiment of the present disclosure;

FIG. 8 is a program module schematic diagram of a noise reducing apparatus provided by an embodiment of the present disclosure; and FIG. 9 is a hardware structural diagram of an electronic device provided by an embodiment of the present disclosure.

DESCRIPTION OF EMBODIMENTS

In order to make purposes, technical solutions and advantages of embodiments of the present disclosure more clear, the technical solutions in the embodiments of the present disclosure will be described clearly and completely below with reference to accompanying drawings in the embodiments of the present disclosure. Obviously, the described embodiments are only a part of the embodiments of the present disclosure, but not all of the embodiments. Based on the embodiments in the present disclosure, all other embodiments obtained by those of ordinary skill in the art without paying creative work fall within a protection scope of the present disclosure.

When an electronic device is in a noisy environment, surrounding environmental noises will cause a great impact on a speech quality collected by the electronic device, thus affecting a speech communication quality or speech interaction process, and reducing user experience and communication efficiency. For example, in a real-time speech communication process, the surrounding environmental noises will inevitably be collected by a speech sender. If a speech signal collected by the speech sender is sent to a speech receiver without processing, a user of the speech receiver will be disturbed by these environmental noises and a normal communication will be affected; if it is not handled properly, speech information sent by the speech sender will be distorted and intelligibility of the speech will be affected. For another example, in the field of human-computer interaction, if speech recognition is performed without processing the speech signal collected by the electronic device, an accuracy of the speech recognition will be affected, and an erroneous response will occur.

Therefore, there is an urgent need for a method of noise reduction, which can effectively suppress the noises and ensure that the speech is not distorted.

An embodiment of the present disclosure provides a method of noise reduction, the method is applied to an electronic device, the electronic device includes a first sound collector and a second sound collector, and installation positions of the first sound collector and the second sound collector are different.

In a feasible implementation, when the electronic device is in normal use, the first sound collector is located at a position close to a mouth of a human body, and the second sound collector is located at a position away from the mouth of the human body.

In another feasible implementation, when the electronic device is in normal use, the first sound collector is located at a position away from a mouth of a human body, and the second sound collector is located at a position close to the human body mouth.

Where the foregoing electronic devices may include mobile terminals such as mobile phones, tablet computers, smart watches and the like, and may also include earphones, smart speakers, televisions, vehicle-mounted terminals and the like, which are not limited in the embodiments of the present disclosure, as long as the above-mentioned electronic devices have a sound acquisition function.

Where the foregoing electronic device may include two sound collectors, namely a first sound collector and a second sound collector; or may include more than two sound collectors. The sound collector described in the embodiments of the present disclosure may be a microphone array, or may be other devices with a sound collection function.

In an embodiment, an application scenario of the foregoing method of noise reduction includes a wireless earphone scenario, for example, a scenario in which a user makes a speech call with other users through the wireless earphone when wearing the wireless earphone.

In an embodiment, the application scenario of the foregoing method of noise reduction also includes a hand-held mobile terminal scenario, for example, a scenario in which a user holds the mobile terminal and puts his mouth close to the first sound collector to make the speech call with other users.

Figure 1:
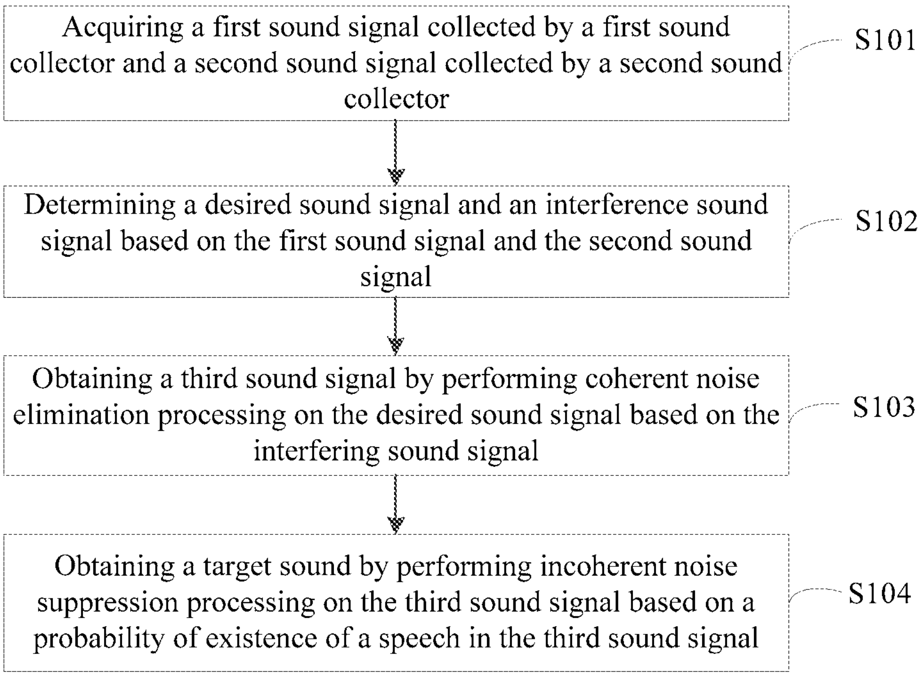
FIG. 1 is a schematic flowchart I of a method of noise reduction provided by an embodiment of the present disclosure.

Referring to FIG. 1, which is a schematic flowchart I of a method of noise reduction provided by an embodiment of the present disclosure, and an execution subject of this embodiment may be an electronic device in the embodiment shown in FIG. 1, and the method includes:

S101, acquiring a first sound signal collected by a first sound collector and a second sound signal collected by a second sound collector.

In an embodiment of the present disclosure, when the electronic device enters a call mode or a speech interaction mode, the first sound collector and the second sound collector simultaneously collect sounds in a surrounding environment, and then the electronic device acquires the first sound signal collected by the first sound collector and the second sound signal collected by the second sound collector.

S102, determining a desired sound signal and an interference sound signal based on the first sound signal and the second sound signal.

In an embodiment of the present disclosure, in a sound collecting process, a sound collector may receive sounds from various directions, including a near-field noise and a far-field noise. In order to better understand the embodiment of the present disclosure, reference may be made to FIG. 2, which is a schematic diagram of spatial distribution of sounds collected by a sound collector according to an embodiment of the present disclosure.

Figure 2:
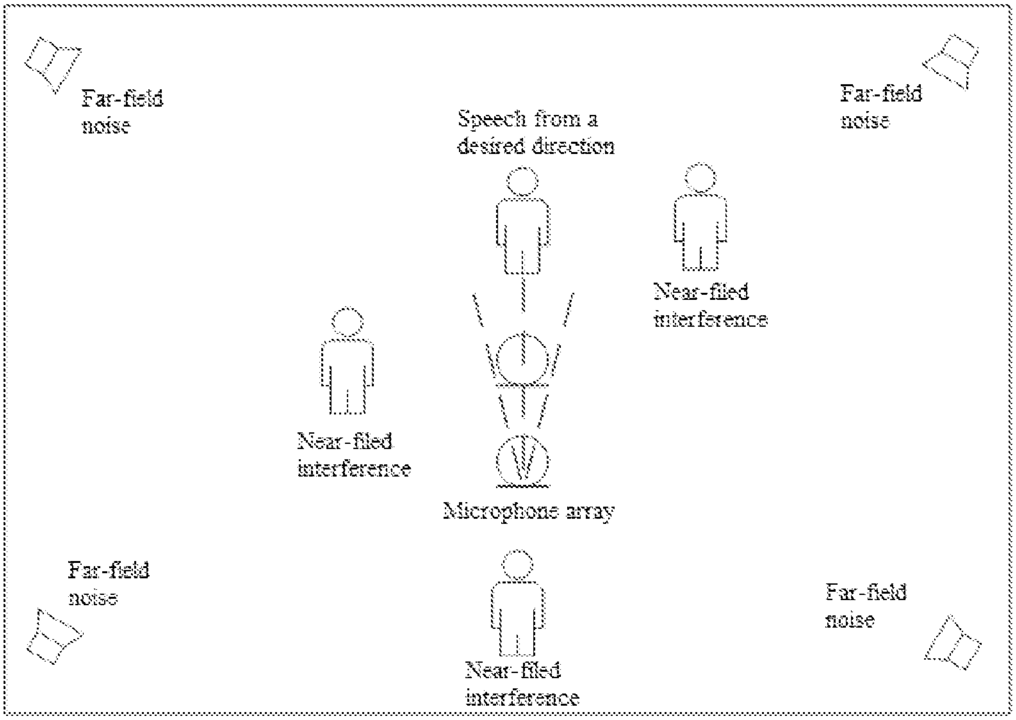
FIG. 2 is a schematic diagram of spatial distribution of sounds collected by a sound collector in an embodiment of the disclosure.

In FIG. 2, the sound collector adopts an omnidirectional microphone array. In the sound collecting process, for noise sources that are close to the microphone array, propagation paths of such noise sources are mainly direct paths, so such noise sources can be regarded as point source noises; common examples are interferences caused by speeches of surrounding people and the like, which are regarded as near-field interferences. For far-distance noise sources, propagation paths of such noise sources are mainly multipath reflection and reverberation, so these noise sources can be regarded as diffuse field noises; common examples are noises from crowd, noises from vehicles and the like, so such noise sources are regarded as far-field noises. Among them, the point source noise in a near field has strong directivity, that is, an energy of noises received by the microphone array in a specific direction is much larger than energies of noises received in other directions; and a far-field diffused field noise has no obvious directivity, that is, energies of noises reaching the microphone array from all directions are with little difference.

In this embodiment, a desired direction of the microphone array is fixed. When the first sound collector is located close to the mouth of the human body, for the point source noise in the near field, it is possible to use the directivity of the microphone array to perform spatial filtering on the first sound signal and the second sound signal, in order to enhance a sound signal from a desired direction and attenuate sound signals from other directions in the first sound signal, to obtain the desired sound signal; and to attenuate a sound signal from the desired direction and enhance sound signals from other directions in the second sound signal, to obtain the interfering sound signal.

In addition, when the second sound collector is located close to the mouth of the human body, it is also possible to perform spatial filtering on the first sound signal and the second sound signal, in order to enhance a sound signal from a desired direction and attenuate sound signals from other directions in the second sound signal, to obtain the desired sound signal; and to attenuate a sound signal from a desired direction and enhance sound signals of other directions in the first sound signal, to obtain the interference sound signal.

S103, obtaining a third sound signal by performing coherent noise elimination processing on the desired sound signal based on the interfering sound signal.

In this embodiment, after obtaining the desired sound signal and the interference sound signal, it is possible to perform the coherent noise elimination processing on the desired sound signal based on the interference sound signal, attenuate the interference sound signal in the desired sound signal, thereby obtaining the third sound signal.

S104, obtaining a target sound signal by performing incoherent noise suppression processing on the third sound signal based on a probability of existence of a speech in the third sound signal.

In an actual scenario, after performing the coherent noise elimination processing on the desired sound signal, it is still necessary to suppress a large amount of incoherent noises in the obtained third sound signal. In this embodiment, in order to reduce influences on a speech signal in the third sound signal when performing the incoherent noise suppression processing, determine the probability of existence of the speech in the third sound signal firstly, and then obtain the target sound signal by performing the incoherent noise suppression processing on the third sound signal based on the foregoing probability.

If the probability of existence of the speech is high, which means that there may exist speech in the third sound signal, then weaken or even not perform an update of noise estimation, thereby preventing a distortion of the speech signal; if the probability of existence of the speech is small, which means that there may not exist speech in the third sound signal, then update the noise estimate.

When performing incoherent noise suppression processing, determine an effective gain function based on an estimated noise signal, and perform the incoherent noise suppression processing on the third sound signal by using the effective gain function. For a better understanding of an embodiment of the present disclosure, reference may be made to FIG. 3, which is a schematic flowchart II of a method of noise reduction provided by an embodiment of the present disclosure.

Figure 3:
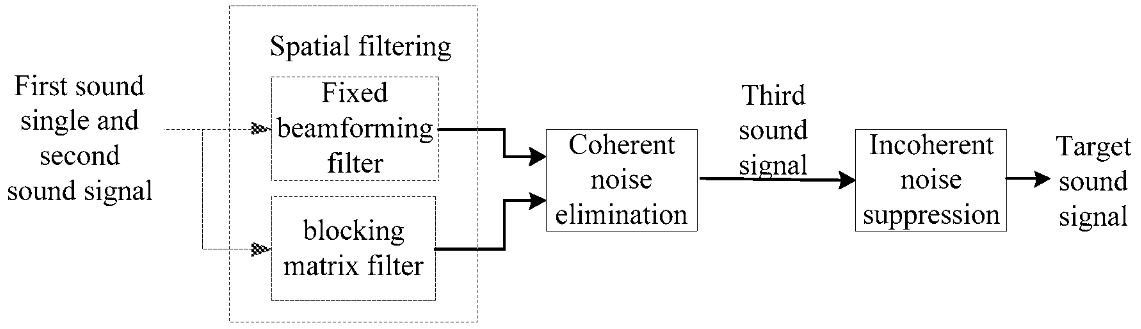
FIG. 3 is a schematic flowchart II of a method of noise reduction provided by an embodiment of the present disclosure.

In FIG. 3, obtaining a desired sound signal and an interference sound signal after performing spatial filtering on a first sound signal and a second sound signal respectively, and then obtain the third sound signal by performing coherent noise elimination processing on the desired sound signal based on the interference sound signal, and finally, obtain a target sound signal by performing incoherent noise suppression processing on the third sound signal based on a probability of existence of a speech in the third sound signal.

In this embodiment, it is possible to use a fixed beamforming (FBF for short) filter to perform spatial filtering on the first sound signal, and use a block matrix (BM for short) filter to perform spatial filtering on the second sound signal. Or, it is also possible to use the fixed beamforming filter to perform spatial filtering on the second sound signal, and use the blocking matrix filter to perform spatial filtering on the first sound signal.

In the method of noise reduction provided by the embodiment of the present disclosure, adopt a first sound collector and a second sound collector to determine a desired sound signal and an interference sound signal, and obtain a third sound signal by performing coherent noise elimination processing on the desired sound signal based on the interference sound signal, and then obtain a target sound signal by performing incoherent noise suppression processing on the third sound signal based on a probability of existence of a speech in the third sound signal, thereby effectively reducing noises in the target sound signal; in addition, since the probability of existence of the speech in the third sound signal is estimated when performing the incoherent noise suppression processing, it is also possible to effectively ensure that the speech is not distorted when the incoherent noise suppression processing is performed.

Based on content described in the foregoing embodiment, in a feasible implementation, in the above S102, the determining the desired sound signal and the interference sound signal based on the first sound signal and the second sound signal, specifically includes:

determining a first frequency domain signal of the first sound signal in a frequency domain and a second frequency domain signal of the second sound signal in the frequency domain; and obtaining the desired sound signal and the interfering sound signal by performing spatial filtering on the first frequency domain signal and the second frequency domain signal.

In the embodiment of the present disclosure, it is possible to perform the spatial filtering of the first sound signal and the second sound signal in the frequency domain, and the implementation in the frequency domain has three advantages: firstly, a delay setting of the spatial filtering is more convenient, a delay in a time domain is limited by a sampling rate, and a minimum delay is one sampling period, the delay less than one sampling period needs to be obtained by changing the sampling rate. Secondly, an adaptive filtering requires less computation; the filtering in the time domain is a convolution operation, and the filtering in the frequency domain is a direct multiplication operation. Thirdly, a granularity of an incoherent noise suppression is finer, and a noise estimation and noise suppression for each frequency point can be processed separately.

In an embodiment, it is possible to obtain the first frequency domain signal of the first sound signal in the frequency domain by performing a short-time Fourier transform on the first sound signal; and obtain the second frequency domain signal of the second sound signal in the frequency domain by performing the short-time Fourier transform on the second sound signal.

In an embodiment, when performing the spatial filtering on the first frequency domain signal and the second frequency domain signal, it is possible to determine a delay duration between a collection moment of the first sound signal and a collection moment of the second sound signal firstly, and then obtain the desired sound signal by performing spatial filtering on the first frequency domain signal and the second frequency domain signal by using a fixed beamforming filter, and obtain the interfering sound signal by performing spatial filtering on the first frequency domain signal and the second frequency domain signal by using a blocking matrix filter based on the delay duration.

Figure 4A:
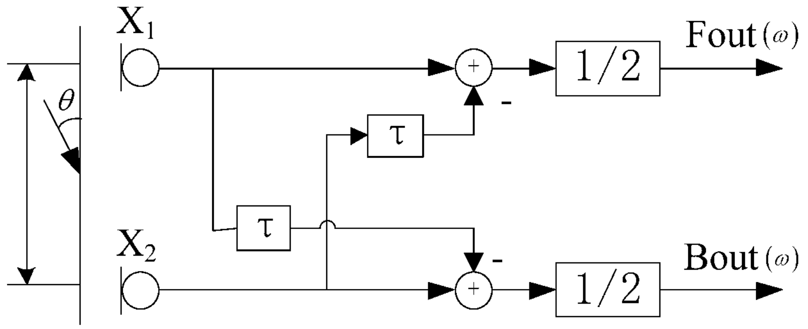

In a feasible embodiment of the present disclosure, refer to FIG. 4*a*, which is a schematic diagram I of filtering in a method of noise reduction according to an embodiment of the present disclosure.

In FIG. 4*a*, taking a wireless earphone as an example, the wireless earphone includes a microphone $X_1$ and a microphone $X_2$, and a distance between the microphone $X_1$ and the microphone $X_2$ is d. In addition, a direction of a desired speech of the wireless earphone is fixed, and an incident angle is θ, that is, in an actual use, the microphone $X_1$ is closer to a position of a mouth of a human body than the microphone $X_2$. When the incident angle θ=0°, a delay of a sound signal between the microphone $X_1$ and the microphone $X_2$ is $\tau_A$=d/c (c represents the speed of sound).

Assuming that there is a virtual microphone $X_0$ between the microphone $X_1$ and the microphone $X_2$, an obtained signal is $X_0$ (ω), then a first frequency domain signal $X_1$(ω) and a second frequency domain signal $X_2$ (ω) are advance and delay of the signal $X_0$ (ω) respectively, where $$k = \frac{2\pi}{\lambda},$$

and λ represents an acoustic wavelength.

$$X_1(\omega) = X_0(\omega)\cdot\exp\left\{j\frac{kd}{2}\cos\theta\right\}$$
$$X_2(\omega) = X_0(\omega)\cdot\exp\left\{-j\frac{kd}{2}\cos\theta\right\}$$

In an embodiment, it is possible to calculate a desired sound signal $F_{out}$ (ω) based on the following formula:

$$F_{out}(\omega)=1/2(X_1(\omega))-X_2(\omega))\cdot\exp\{-j\omega\tau\});$$

it is possible to calculate an interfering sound signal $B_{out}$ (ω) based on the following formula:

$$B_{out}(\omega)=_{1/2}(X_2(\omega)-X_1(\omega)\cdot\exp\{-j\omega\tau\});$$

where $X_1$(ω) represents the first frequency domain signal, $X_2$ (ω) represents the second frequency domain signal, and τ represents a delay duration.

Figure 4B:
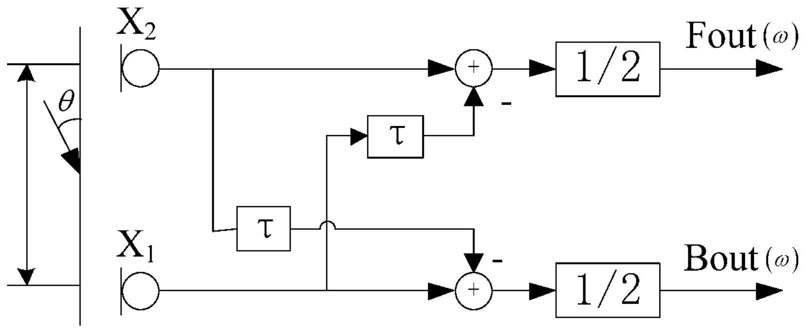

In another feasible embodiment of the present disclosure, refer to FIG. 4*b*, which is a schematic diagram II of filtering in a method of noise reduction according to an embodiment of the present disclosure.

In FIG. 4*b*, still take a wireless earphone as an example, the wireless earphone includes a microphone $X_1$ and a microphone $X_2$, and a distance between the microphone $X_1$ and the microphone $X_2$ is d. In addition, a direction of a desired speech of the wireless earphone is fixed, and an incident angle is θ, that is, in an actual use, the microphone $X_2$ is closer to a position of a mouth of a human body than the microphone $X_1$. When the incident angle θ=0°, a delay of a sound signal between the microphone $X_1$ and the microphone $X_2$ is $\tau_A$=d/c (c represents the speed of sound).

Assuming that there is a virtual microphone $X_0$ between the microphone $X_1$ and the microphone $X_2$, an obtained signal is $X_0$ (ω), then a second frequency domain signal $X_2$ (ω) and a first frequency domain signal $X_1$(ω) are advance and delay of $$k = \frac{2\pi}{\lambda},$$

the signal $X_0$ (ω) respectively, where and A represents an acoustic wavelength.

$$X_2(\omega) = X_0(\omega)\cdot\exp\left\{j\frac{kd}{2}\cos\theta\right\}$$
$$X_1(\omega) = X_0(\omega)\cdot\exp\left\{-j\frac{kd}{2}\cos\theta\right\}$$

In an embodiment, it is possible to calculate a desired sound signal $F_{out}$(ω) based on the following formula:

$$F_{out}(\omega)=\tfrac{1}{2}(X_2(\omega)-X_1(\omega)\cdot\exp\{-j\omega\tau\});$$

it is possible to calculate an interfering sound signal $B_{out}$ (ω) based on the following formula:

$$B_{out}(\omega)=\tfrac{1}{2}(X_1(\omega)-X_2(\omega)\cdot\exp\{-j\omega\tau\});$$

where $X_1$(ω) represents the first frequency domain signal, $X_2$(ω) represents the second frequency domain signal, and τ represents a delay duration.

For a better understanding of embodiments of the present disclosure, refer to FIG. 5, which is a beam schematic diagram of a desired sound signal according to an embodiment of the present disclosure.

In FIG. 5, take a delay duration τ=$\tau_A$. When a desired speech signal propagates from a direction in a range of 0°±30°, sound signals in other directions can be regarded as interference signals. It can be seen from an obtained beam pattern that, a gain is 0 dB in the range of 0°±30°, and there are different degrees of attenuations in other directions, and a maximum attenuation is in the 180° direction.

Refer to FIG. 6, which is a beam schematic diagram of an interfering sound signal according to an embodiment of the present disclosure.

In FIG. 6, also take a delay duration τ=$\tau_A$, assume that a desired speech signal propagates from a direction in a range of 0°±30°, and sound signals in other directions are regarded as interference signals. It can be seen from an obtained beam pattern that the interfering sound signal has a largest attenuation in the 0° direction and a smallest attenuation in the 180° direction.

That is, in the method of noise reduction provided by the embodiments of the present disclosure, after the spatial filtering is performed on the first sound signal and the second sound signal, an interference sound signal component in the desired sound signal can be effectively attenuated, and a desired sound signal component in the interference sound signal can be effectively attenuated. Therefore, when performing coherent noise elimination processing on the desired sound signal based on the interfering sound signal, coherent noises in the desired sound signal can be effectively filtered out.

Based on content described in the above embodiment, in a feasible implementation, in the above S102, the determining the desired sound signal and the interference sound signal based on the first sound signal and the second sound signal, further includes:

determining a first frequency domain signal of the first sound signal in a frequency domain and a second frequency domain signal of the second sound signal in the frequency domain, determining the first frequency domain signal as the desired sound signal and determining the second frequency domain signal as the interfering sound signal; or, determining the second frequency domain signal as the desired sound signal and determining the first frequency domain signal as the interfering sound signal.

That is, the method provided by the embodiment of the present disclosure is also applicable to a scenario of holding an electronic device. For example, when a user holds the electronic device and brings his mouth close to a first sound collector, in a first sound signal picked up by the first sound collector close to the mouth, a desired sound signal is significantly more than an interference sound signal; and in a second sound signal picked up by a second sound collector far away from the mouth, the desired sound signal is significantly less than the interference sound signal. At this time, it is possible to obtain a third sound signal by performing coherent noise elimination processing on the first sound signal based on the second sound signal, and then obtain a target sound signal by performing incoherent noise suppression processing on the third sound signal based on a probability of existence of a speech in the third sound signal.

For another example, when the user holds the electronic device and brings his mouth close to the second sound collector, in the second sound signal picked up by the second sound collector close to the mouth, the desired sound signal is significantly more than the interference sound signal; in the first sound signal picked up by the first sound collector close to the mouth, the desired sound signal is significantly less than the interference sound signal. At this time, it is possible to o obtain the third sound signal by performing coherent noise elimination processing on the second sound signal based on the first sound signal, and then obtain the target sound signal by performing incoherent noise suppression processing on the third sound signal based on the probability of existence of the speech in the third sound signal.

That is, in a feasible implementation of the present disclosure, it is possible to simply perform coherent noise processing and incoherent noise suppression without performing spatial filtering on the first sound signal and the second sound signal, thereby effectively reducing noises in the obtained target sound signal.

Based on content described in the foregoing embodiment, in a feasible implementation, in the above S103, the obtaining the third sound signal by performing the coherent noise elimination processing on the desired sound signal based on the interfering sound signal specifically includes:

calculating to obtain the third sound signal $Y_D(k)$ by using the following formula:

$$Y_D(k)=F_{out}(k)-W(k)\cdot B_{out}(k);$$

where $F_{out}(k)$ represents the desired sound signal, $B_{out}(k)$ represents the interference sound signal, k represents a k-th frequency point, and W (k) represents an adaptive filter coefficient, and:

$$W_{n+1}(k)=W_n(k)+\mu_0\cdot\mu_{SIR}\cdot\frac{B_{out}(k)Y_D(k)^*}{\|B_{out}(k)\|^2+\delta};$$

where $\mu_0$ represents an update step size, $\mu_{SIR}$ represents a variable update step size, the variable update step size $\mu_{SIR}$ changes with a change of a power ratio of the desired sound signal and the interference sound signal, δ is a preset parameter, and $B_{out}(k)Y_D(k)^*$ represents a conjugate correlation between the interfering sound signal $B_{out}(k)$ and the third sound signal $Y_D(k)$.

Where the power ratio of the desired sound signal and the interfering sound signal can be used as a control condition for a coherent noise update, and the ratio can be approximately regarded as a signal to interference ratio (SIR for short).

In an embodiment, $\mu_0$ is a fixed update step size, whose value is generally between 0.01 and 0.1, and $\mu_0$ is a fixed value. $\mu_{SIR}$ is the variable update step size that varies with the SIR, and is negatively correlated with the SIR. The larger the SIR, the smaller the $\mu_{SIR}$, and the slower coefficients update. The value of $\mu_{SIR}$ is between 0 and 1. A denominator is an energy of the interfering sound signal Bout(k) plus a fixed value 6. A value of δ ranges from 1e-5 to 1e-10, which can avoid the denominator being 0.

That is, in this embodiment, when coefficients of the adaptive filter are updated, a ratio approximately to the SIR is used for control. If the SIR is high, which means that it is a speech signal currently, and then the adaptive filtering reduces the update or even does not update; if the SIR is low, which means that it is an interference signal currently, and coefficients of the adaptive filter needs to be updated.

Based on content described in the foregoing embodiment, in a feasible implementation, refer to FIG. 7, which is a schematic flowchart II of a method of noise reduction provided by an embodiment of the present disclosure. In the foregoing S104, the obtaining the target sound signal by performing the incoherent noise suppression processing on the third sound signal based on the probability of existence of the speech in the third sound signal specifically includes:

S701, determining a smoothed power spectrum corresponding to the third sound signal;

S702, determining a probability of absence of a priori speech corresponding to the third sound signal based on the smoothed power spectrum;

S703, determining a probability of existence of a posteriori speech corresponding to the third sound signal based on the probability of absence of the priori speech;

S704, determining an incoherent noise signal existing in the third sound signal by using the probability of existence of the posteriori speech, and determining an effective gain function corresponding to the third sound signal based on the incoherent noise signal; and

S705, performing incoherent noise suppression processing on the third sound signal by using the effective gain function.

Specifically, assuming that the third sound signal is X(k,t), which represents a value of the third sound signal at a k-th frequency point and a t-th frame, calculate an instantaneous power spectrum for the third sound signal firstly, and then calculate the smoothed power spectrum $S_1(k,t)$ corresponding to the third sound signal from the instantaneous power spectrum:

$$S_1(k,t)=\alpha_1\cdot S_1(k,t-1)+(1-\alpha_1)\cdot\|X(k,t)|^2$$

where t−1 represents a value of a previous frame, and $\alpha_1$ is a smoothing coefficient which is generally 0.8-0.95.

Then making a ration by using the smoothed power spectrum $S_1(k,t)$ and a minimum value of the power spectrum $S_{min}(k,t)$:

$$\delta = \frac{S_1(k,t)}{S_{min}(k,t)}$$

The formula for calculating the probability of absence of the priori speech q(k,t) through a range of the foregoing ratio is as follows:

$$q(k,t) = \begin{cases} 0 & ; \quad \text{if } \delta > \delta_{max} \\ \dfrac{\delta_{max} - \delta}{\delta_{max} - \delta_{min}} & ; \quad \text{if } \delta_{min} < \delta \le \delta_{max} \\ 1 & ; \quad \text{if } \delta \le \delta_{min} \end{cases}$$

where $\delta_{min}$ and $\delta_{max}$ are preset values, generally 1 and 3 respectively.

After obtaining the probability of absence of the priori speech q(k,t), it is possible to obtain the probability of existence of the posterior speech p(k,t). The formula is as follows:

$$p(k,t) = \frac{1 - q(k,t)}{[1 - q(k,t)] + q(k,t)[1 + \xi(k,t)]\exp[-v(k,t)]}$$

where $\xi(k,t)=\lambda_s(k,t)/\lambda_n(k,t)$, $\lambda_s(k,t)$ is an estimated clean speech power, $\lambda_n(k,t)$ is an estimated noise speech power, and $v(k,t)=\gamma(k,t)\ \xi(k,t)/[1+\xi(k,t)]$.

Update the noise by using the probability of existence of the posterior speech p(k,t):

$$\lambda_n(k,t)=\alpha_n(k,t)\cdot\lambda_n(k,t-1)+[1-\alpha_n(k,t)]\cdot|X(k,t)|^2$$

where $\alpha_n(k,t)$ is a smoothing coefficient, which is related to p(k,t), and its formula is:

$$\alpha_n(k,t)=\alpha_2+(1-\alpha_2)\cdot p(k,t).$$

where $\alpha_2$ ranges from 0.8 to 0.95.

By estimating a current frame noise $\lambda_n(k,t)$, it is possible to obtain a priori signal-to-noise ratio $\xi(k,t)$ and a posterior signal-to-noise ratio $\gamma(k,t)$ of the current frame, and further obtain the gain g(k,t) through calculation. There are various methods for gain calculation, such as Wiener gain and Optimally Modified Log-Spectral Amplitude Estimator (OMLSA for short) gain and the like, which are not limited here.

In addition, the minima statistical (MS for short), minima-controlled recursive averaging (MCRA for short), and improved minima controlled recursive averaging (IMCRA for short) and the like can also be used to perform the foregoing noise estimation, which is also not limited here.

In this embodiment, in the incoherent noise suppression processing, the probability of existence of the speech p(k,t) is used to estimate the noise. If p(k,t) is large, it means that there exists speech, and weaken or even not perform an update of the noise estimate, thus reducing distortion. Otherwise, update a noise power.

That is, in the method of noise reduction provided in this embodiment, when the incoherent noise suppression processing is performed, the probability of existence of the speech, the priori signal-to-noise ratio and the posterior signal-to-noise ratio are taken into account, so that the noise estimation is more accurate, and the gain calculation is more improved, thereby greatly improving an ability of noise suppression and maintaining a fidelity of the speech.

Based on content described in the foregoing embodiments, an embodiment of the present disclosure further provides a noise reducing apparatus, the apparatus is applied to an electronic device, the electronic device includes a first sound collector and a second sound collector, and installation positions of the first sound collector and the second sound collector are different.

Refer to FIG. 8, which is a program module schematic diagram of a noise reducing apparatus provided by an embodiment of the present disclosure, and the apparatus includes:

an acquiring module 801, configured to acquire a first sound signal collected by the first sound collector and a second sound signal collected by the second sound collector;

a determining module 802, configured to determine a desired sound signal and an interference sound signal based on the first sound signal and the second sound signal;

a coherent processing module 803, configured to obtain a third sound signal by performing coherent noise elimination processing on the desired sound signal based on the interfering sound signal; and an incoherent processing module 804, configured to obtain a target sound signal by performing incoherent noise suppression processing on the third sound signal based on a probability of existence of a speech in the third sound signal.

In a feasible implementation, the determining module 802 specifically includes:

a first determining module, configured to determine a first frequency domain signal of the first sound signal in a frequency domain, and a second frequency domain signal of the second sound signal in the frequency domain; and a spatial filtering module, configured to obtain the desired sound signal and the interference sound signal by performing spatial filtering on the first frequency domain signal and the second frequency domain signal.

In a feasible implementation, the spatial filtering module is specifically configured to:

determine a delay duration between a collection moment of the first sound signal and a collection moment of the second sound signal; and obtain the desired sound signal by performing spatial filtering on the first frequency domain signal and the second frequency domain signal by using a fixed beamforming filter, and obtain the interference sound signal by performing spatial filtering on the first frequency domain signal and the second frequency domain signal by using the blocking matrix filter based on the delay duration.

In a feasible implementation, calculate the desired sound signal $F_{out}(\omega)$ based on the following formula:

$$F_{out}(\omega)=1/2(X_1(\omega)-X_2(\omega)\cdot\exp\{-j\omega\tau\});$$

calculate the interfering sound signal $B_{out}(\omega)$ based on the following formula:

$$B_{out}(\omega)=1/2(X_2(\omega)-X_1(\omega)\cdot\exp\{-j\omega\tau\});$$

where $X_1(\omega)$ represents the first frequency domain signal, $X_2(\omega)$ represents the second frequency domain signal, and T represents the delay duration.

In another possible implementation, calculate the desired sound signal $F_{out}$ (ω) based on the following formula:

$$F_{out}(\omega)=1/2(X_2(\omega)-X_1(\omega)\cdot\exp\{-j\omega\tau\});$$

calculate the interfering sound signal $B_{out}(\omega)$ based on the following formula:

$$B_{out}(\omega)=_{1/2}(X_1(\omega)-X_2(\omega)\cdot\exp\{-j\omega\tau\})$$

where $X_1(\omega)$ represents the first frequency domain signal, $X_2(\omega)$ represents the second frequency domain signal, and τ represents the delay duration.

In a feasible implementation, the determining module 802 specifically includes:

a second determining module, configured to determine a first frequency domain signal of the first sound signal in a frequency domain and a second frequency domain signal of the second sound signal in the frequency domain; and a third determining module, configured to determine the first frequency domain signal as the desired sound signal, and determine the second frequency domain signal as the interference sound signal; or, determine the second frequency domain signal as the desired sound signal, and determine the first frequency domain signal as the interference sound signal.

In a feasible implementation, the coherent processing module 803 is specifically configured to:

calculate to obtain the third sound signal $Y_D(k)$ by using the following formula:

$$Y_D(k)=F_{out}(k)-W(k)\cdot B_{out}(k);$$

where $F_{out}(k)$ represents the desired sound signal, $B_{out}(k)$ represents the interference sound signal, the k represents the k-th frequency point, and W(k) represents an adaptive filter coefficient, and:

$$W_{n+1}(k)=W_n(k)+\mu_0\cdot\mu_{SIR}\cdot\frac{B_{out}(k)Y_D(k)^*}{\|B_{out}(k)\|^2+\delta};$$

where $\mu_0$ represents an update step size, $\mu_{SIR}$ represents a variable update step size, the variable update step size $\mu_{SIR}$ changes with a change of a power ratio of the desired sound signal and the interference sound signal, δ is a preset parameter, and $B_{out}(k)Y_D(k)^*$ represents a conjugate correlation between the interference sound signal $B_{out}(k)$ and the third sound signal $Y_D(k)$.

In a feasible implementation, the incoherent processing module 804 specifically includes:

a first calculating module, configured to determine a smoothed power spectrum corresponding to the third sound signal;

a second calculating module, configured to determine a probability of absence of a priori speech corresponding to the third sound signal based on the smoothed power spectrum;

a third calculating module, configured to determine a probability of existence of a posteriori speech corresponding to the third sound signal based on the probability of absence of the priori speech;

a gain determining module, configured to determine an incoherent noise signal existing in the third sound signal by using the probability of existence of the posteriori speech, and determine an effective gain function corresponding to the third sound signal based on the incoherent noise signal; and a noise suppressing module, configured to perform the incoherent noise suppression processing on the third sound signal by using the effective gain function.

It can be understood that the noise reducing apparatus provided in this embodiment can be used to implement the technical solutions of the foregoing method embodiments, and its implementation principle and technical effect are similar. For details, please refer to descriptions in the foregoing method embodiments, which will not be elaborated herein.

In the noise reducing apparatus provided by the embodiment of the present disclosure, adopt a first sound collector and a second sound collector to determine a desired sound signal and an interference sound signal, and obtain a third sound signal by performing coherent noise elimination processing on the desired sound signal based on the interference sound signal, and then obtain a target sound signal by performing incoherent noise suppression processing on the third sound signal based on a probability of existence of a speech in the third sound signal, thus effectively reducing noises in the target sound signal. In addition, since the probability of existence of the speech in the third sound signal is estimated when the incoherent noise suppression processing is performed, it is also possible to effectively ensure that the speech is not distorted when the incoherent noise suppression processing is performed.

An embodiment of the present disclosure further provides an electronic device, including: at least one processor and a memory, and a first sound collector and a second sound collector, installation positions of the first sound collector and the second sound collector are different; the memory stores computer-executed instructions; and the at least one processor executes the computer-executed instructions stored in the memory, to enable the at least one processor to perform the method of noise reduction as described in the above embodiments.

Specifically, reference can be made to FIG. 9, which is a hardware structural diagram of an electronic device provided by an embodiment of the present disclosure. As shown in FIG. 9, the electronic device 90 in this embodiment includes: a processor 901 and a memory 902; where the memory 902, configured to store computer-executed instructions;

the processor 901, configured to execute the computer-executed instructions stored in the memory, so as to implement various steps performed by the electronic device in the foregoing embodiments. For details, reference can be made to relevant descriptions in the foregoing method embodiments.

In an embodiment, the memory 902 may be independent or integrated with the processor 901.

When the memory 902 is set independently, the electronic device further includes a bus 903, which is configured to connect the memory 902 and the processor 901.

An embodiment of the present disclosure further provide a computer-readable storage medium, where computer-executable instructions are stored in the computer-readable storage medium, and when the computer-executable instructions are executed by a processor, the foregoing method of noise reduction is implemented.

In the several embodiments provided in the present disclosure, it should be understood that the disclosed apparatus and method may be implemented in other manners. For example, the device embodiments described above are only illustrative. For example, a division of modules is only a logical function division, there may be other division methods in an actual implementation. For example, multiple modules may be combined or integrated into another system, or some features can be ignored, or not implemented. On the other hand, a mutual coupling or direct coupling or communication connection that shown or discussed may be implemented through some interfaces, and an indirect coupling or communication connection of apparatus or modules may be in electrical, mechanical or other forms.

The modules described as separate components may or may not be physically separated, and components shown as the modules may or may not be physical units, that is, may be located in one place, or may be distributed to multiple network units. Some or all of the modules may be selected based on an actual requirement to achieve a purpose of the solution in this embodiment.

In addition, each functional module in each embodiment of the present disclosure may be integrated in one processing unit, or each module may exist physically alone, or two or more modules may be integrated in one unit. The units integrated by the foregoing modules can be implemented in a hardware form, or can be implemented in a form of hardware combining with software functional units.

The foregoing integrated modules implemented in the form of software functional modules may be stored in a computer-readable storage medium. The foregoing software function modules are stored in a storage medium, and include several instructions to enable a computer device (which may be a personal computer, a server, or a network device, and the like) or a processor to execute parts of steps of the method according to various embodiments of the present disclosure.

It should be understood that the processor may be a central processing unit (CPU for short), and can also be other general-purpose processors, a digital signal (DSP for short), an application specific integrated circuit (ASIC for short) and the like. The general-purpose processor may be a microprocessor or the processor may be any conventional processor or the like. Steps of the method disclosed in combination with the present disclosure can be directly embodied as being executed by a hardware processor, or executed by a combination of hardware and software modules in the processor.

The memory may include a high-speed RAM memory, and may also include a non-volatile storage NVM, such as at least one magnetic disk memory, and may also be a U disk, a removable hard disk, a read-only memory, a magnetic disk or an optical disk and the like.

The bus may be an industry standard architecture (ISA for short) bus, a peripheral component (PCI for short) bus, or an extended industry standard architecture (EISA for short) bus, or the like. The bus can be divided into an address bus, a data bus, a control bus and the like. For convenience of representation, the buses in the accompanying drawings of the present disclosure are not limited to only one bus or one type of bus.

The foregoing storage medium can be implemented by any type of volatile or non-volatile storage devices or combinations thereof, such as a static random access memory (SRAM), an electrically erasable programmable read-only memory (EEPROM for short), an erasable except programmable read only memory (EPROM for short), a programmable read only memory (PROM for short), a read only memory (ROM for short), a magnetic memory, a flash memory, a magnetic disk or an optical disk. The storage medium can be any available medium that can be accessed by a general-purpose or special purpose computer.

An exemplary storage medium is coupled to the processor, such that the processor can read information from, and write information to, the storage medium. Of course, the storage medium can also be an integral part of the processor. The processor and the storage medium may be located in an application specific integrated circuit (ASIC for short). And of course, the processor and the storage medium may also exist in the electronic device or a host device as discrete components.

Those of ordinary skill in the art can understand that all or part of the steps in the foregoing method embodiments may be completed by program instructions related to the hardware. The foregoing program can be stored in a computer-readable storage medium. When the program is executed, the steps including the above method embodiments are executed; and the foregoing storage medium includes an ROM, an RAM, a magnetic disk or an optical disk and other mediums that can store program codes.

Finally, it should be noted that the foregoing embodiments are only used to illustrate the technical solutions of the present disclosure, but not to limit thereto; although the present disclosure has been described in detail with reference to the foregoing embodiments, those of ordinary skill in the art should understand that the technical solutions described in the foregoing embodiments can still be modified, or some or all of the technical features thereof can be equivalently replaced; and these modifications or replacements do not make an essence of the corresponding technical solutions deviate from a scope of the technical solutions of the embodiments of the present disclosure.

What is claimed is:

1. A method of noise reduction, wherein the method is applied to an electronic device, the electronic device comprises a first sound collector and a second sound collector, and installation positions of the first sound collector and the second sound collector are different, the method comprises:

acquiring a first sound signal collected by the first sound collector and a second sound signal collected by the second sound collector;

determining a desired sound signal and an interference sound signal based on the first sound signal and the second sound signal;

obtain a third sound signal by performing coherent noise elimination processing on the desired sound signal based on the interference sound signal; and obtain a target sound signal by performing incoherent noise suppression processing on the third sound signal based on a probability of existence of a speech in the third sound signal;

wherein obtaining the third sound signal by performing the coherent noise elimination processing on the desired sound signal based on the interference sound signal comprises:

obtaining the third sound signal by calculating a difference between the desired sound signal and a product of the interfering sound signal and an adaptive filter coefficient;

wherein the (n+1)-th adaptive filter coefficient is obtained based on the n-th adaptive filter coefficient, an update step size, a variable update step size, a preset parameter and a conjugate correlation between the interference sound signal and the third sound signal, and the variable update step size changes with a change of a power ratio of the desired sound signal and the interference sound signal.

2. The method according to claim 1, wherein determining the desired sound signal and the interference sound signal based on the first sound signal and the second sound signal comprises:

determining a first frequency domain signal of the first sound signal in a frequency domain, and a second frequency domain signal of the second sound signal in the frequency domain; and obtain the desired sound signal and the interference sound signal by performing spatial filtering on the first frequency domain signal and the second frequency domain signal.

3. The method according to claim 2, wherein obtaining the desired sound signal and the interference sound signal by performing spatial filtering on the first frequency domain signal and the second frequency domain signal comprises:

determining a delay duration between a collection moment of the first sound signal and a collection moment of the second sound signal; and obtaining the desired sound signal by performing spatial filtering on the first frequency domain signal and the second frequency domain signal by using a fixed beamforming filter, and obtaining the interference sound signal by performing spatial filtering on the first frequency domain signal and the second frequency domain signal by using a blocking matrix filter based on the delay duration.

4. The method according to claim 3, wherein obtaining the desired sound signal by performing spatial filtering on the first frequency domain signal and the second frequency domain signal by using the fixed beamforming filter, and obtaining the interference sound signal by performing spatial filtering on the first frequency domain signal and the second frequency domain signal by using the blocking matrix filter based on the delay duration, comprises:

calculating the desired sound signal based on a difference between the first frequency domain signal and a product of the second frequency domain signal and an exponential function related to the delay duration;

calculating the interfering sound signal based on a difference between the second frequency domain signal and a product of the first frequency domain signal and the exponential function related to the delay duration;

or, calculating the desired sound signal based on a difference between the second frequency domain signal and a product of the first frequency domain signal and an exponential function related to the delay duration;

calculating the interfering sound signal based on a difference between the first frequency domain signal and a product of the second frequency domain signal and the exponential function related to the delay duration.

5. The method according to claim 1, wherein determining the desired sound signal and the interference sound signal based on the first sound signal and the second sound signal comprises:

determining a first frequency domain signal of the first sound signal in a frequency domain and a second frequency domain signal of the second sound signal in the frequency domain; and determining the first frequency domain signal as the desired sound signal, and determining the second frequency domain signal as the interference sound signal; or, determining the second frequency domain signal as the desired sound signal, and determining the first frequency domain signal as the interference sound signal.

6. The method according to claim 1, wherein obtaining the target sound signal by performing the incoherent noise suppression processing on the third sound signal based on the probability of existence of the speech in the third sound signal comprises:

determining a smoothed power spectrum corresponding to the third sound signal;

determining a probability of absence of a priori speech corresponding to the third sound signal based on the smoothed power spectrum;

determining a probability of existence of a posteriori speech corresponding to the third sound signal based on the probability of absence of the priori speech;

determining an incoherent noise signal existing in the third sound signal by using the probability of existence of the posteriori speech, and determining an effective gain function corresponding to the third sound signal based on the incoherent noise signal; and performing the incoherent noise suppression processing on the third sound signal by using the effective gain function.

7. An apparatus of noise reduction, wherein the apparatus is applied to an electronic device, the electronic device comprises a first sound collector and a second sound collector, installation positions of the first sound collector and the first sound collector are different; the apparatus comprises:

at least one processor; and a memory communicatively connected with the at least one processor;

the at least one processor executes computer-executable instructions stored in the memory to cause the at least one processor to:

acquire a first sound signal collected by the first sound collector and a second sound signal collected by the second sound collector;

determine a desired sound signal and an interference sound signal based on the first sound signal and the second sound signal;

obtain a third sound signal by performing coherent noise elimination processing on the desired sound signal based on the interfering sound signal; and obtain a target sound signal by performing incoherent noise suppression processing on the third sound signal based on a probability of existence of a speech in the third sound signal;

wherein the at least one processor is configured to:

obtain the third sound signal by calculating a difference between the desired sound signal and a product of the interfering sound signal and an adaptive filter coefficient;

wherein the (n+1)-th adaptive filter coefficient is obtained based on the n-th adaptive filter coefficient, an update step size, a variable update step size, a preset parameter and a conjugate correlation between the interference sound signal and the third sound signal, and the variable update step size changes with a change of a power ratio of the desired sound signal and the interference sound signal.

8. The apparatus according to claim 7, wherein the at least one processor is further configured to:

determine a first frequency domain signal of the first sound signal in a frequency domain, and a second frequency domain signal of the second sound signal in the frequency domain; and obtain the desired sound signal and the interference sound signal by performing spatial filtering on the first frequency domain signal and the second frequency domain signal.

9. The apparatus according to claim 8, wherein the at least one processor is further configured to:

determine a delay duration between a collection moment of the first sound signal and a collection moment of the second sound signal; and obtain the desired sound signal by performing spatial filtering on the first frequency domain signal and the second frequency domain signal by using a fixed beamforming filter, and obtain the interference sound signal by performing spatial filtering on the first frequency domain signal and the second frequency domain signal by using a blocking matrix filter based on the delay duration.

10. The apparatus according to claim 9, wherein the at least one processor is further configured to:

calculate the desired sound signal based on a difference between the first frequency domain signal and a product of the second frequency domain signal and an exponential function related to the delay duration;

calculate the interfering sound signal based on a difference between the second frequency domain signal and a product of the first frequency domain signal and the exponential function related to the delay duration;

or, calculate the desired sound signal based on a difference between the second frequency domain signal and a product of the first frequency domain signal and an exponential function related to the delay duration;

calculate the interfering sound signal based on a difference between the first frequency domain signal and a product of the second frequency domain signal and the exponential function related to the delay duration.

11. The apparatus according to claim 7, wherein the at least one processor is further configured to:

determine a first frequency domain signal of the first sound signal in a frequency domain and a second frequency domain signal of the second sound signal in the frequency domain; and determine the first frequency domain signal as the desired sound signal, and determine the second frequency domain signal as the interference sound signal; or, determine the second frequency domain signal as the desired sound signal, and determine the first frequency domain signal as the interference sound signal.

12. The apparatus according to claim 7, wherein the at least one processor is further configured to:

determine a smoothed power spectrum corresponding to the third sound signal;

determine a probability of absence of a priori speech corresponding to the third sound signal based on the smoothed power spectrum;

determine a probability of existence of a posteriori speech corresponding to the third sound signal based on the probability of absence of the priori speech;

determine an incoherent noise signal existing in the third sound signal by using the probability of existence of the posteriori speech, and determine an effective gain function corresponding to the third sound signal based on the incoherent noise signal; and perform the incoherent noise suppression processing on the third sound signal by using the effective gain function.

13. A non-transitory computer-readable storage medium, wherein computer-executed instructions are stored in the computer-readable storage medium, and when a processor executes the computer-executed instructions, the processor is enabled to:

acquire a first sound signal collected by a first sound collector and a second sound signal collected by a second sound collector;

determine a desired sound signal and an interference sound signal based on the first sound signal and the second sound signal;

obtain a third sound signal by performing coherent noise elimination processing on the desired sound signal based on the interference sound signal; and obtain a target sound signal by performing incoherent noise suppression processing on the third sound signal based on a probability of existence of a speech in the third sound signal;

wherein when the processor executes the computer-executed instructions, the processor is enabled to:

obtain the third sound signal by calculating a difference between the desired sound signal and a product of the interfering sound signal and an adaptive filter coefficient;

wherein the (n+1)-th adaptive filter coefficient is obtained based on the n-th adaptive filter coefficient, an update step size, a variable update step size, a preset parameter and a conjugate correlation between the interference sound signal and the third sound signal, and the variable update step size changes with a change of a power ratio of the desired sound signal and the interference sound signal.

14. The non-transitory computer-readable storage medium according to claim 13, wherein when the processor executes the computer-executed instructions, the processor is further enabled to:

determine a first frequency domain signal of the first sound signal in a frequency domain, and a second frequency domain signal of the second sound signal in the frequency domain; and obtain the desired sound signal and the interference sound signal by performing spatial filtering on the first frequency domain signal and the second frequency domain signal.

15. The non-transitory computer-readable storage medium according to claim 14, wherein when the processor executes the computer-executed instructions, the processor is further enabled to:

determine a delay duration between a collection moment of the first sound signal and a collection moment of the second sound signal; and obtain the desired sound signal by performing spatial filtering on the first frequency domain signal and the second frequency domain signal by using a fixed beamforming filter, and obtain the interference sound signal by performing spatial filtering on the first frequency domain signal and the second frequency domain signal by using a blocking matrix filter based on the delay duration.

16. The non-transitory computer-readable storage medium according to claim 15, wherein when the processor executes the computer-executed instructions, the processor is further enabled to:

calculate the desired sound signal based on a difference between the first frequency domain signal and a product of the second frequency domain signal and an exponential function related to the delay duration;

calculate the interfering sound signal based on a difference between the second frequency domain signal and a product of the first frequency domain signal and the exponential function related to the delay duration;

or, calculate the desired sound signal based on a difference between the second frequency domain signal and a product of the first frequency domain signal and an exponential function related to the delay duration;

calculate the interfering sound signal based on a difference between the first frequency domain signal and a product of the second frequency domain signal and the exponential function related to the delay duration.

17. The non-transitory computer-readable storage medium according to claim 13, wherein when the processor executes the computer-executed instructions, the processor is further enabled to:

determine a first frequency domain signal of the first sound signal in a frequency domain and a second frequency domain signal of the second sound signal in the frequency domain; and determine the first frequency domain signal as the desired sound signal, and determine the second frequency domain signal as the interference sound signal; or, determine the second frequency domain signal as the desired sound signal, and determine the first frequency domain signal as the interference sound signal.

18. The non-transitory computer-readable storage medium according to claim 13, wherein when the processor executes the computer-executed instructions, the processor is further enabled to:

determine a smoothed power spectrum corresponding to the third sound signal;

determine a probability of absence of a priori speech corresponding to the third sound signal based on the smoothed power spectrum;

determine a probability of existence of a posteriori speech corresponding to the third sound signal based on the probability of absence of the priori speech;

determine an incoherent noise signal existing in the third sound signal by using the probability of existence of the posteriori speech, and determine an effective gain function corresponding to the third sound signal based on the incoherent noise signal; and perform the incoherent noise suppression processing on the third sound signal by using the effective gain function.

* * * * *